United States Patent
DeLons et al.

[11] Patent Number: 5,207,907
[45] Date of Patent: May 4, 1993

[54] COMPACT APPARATUS FOR TREATING SLUDGE BY DRAINING AND PRESSING

[75] Inventors: Luc DeLons, Rueil Malmaison; Joseph Andrieu, Velizy; Patrick Bele, Saint Germain En Laye, all of France

[73] Assignee: DeGremont, Rueil Malmaison, France

[21] Appl. No.: 848,185

[22] Filed: Mar. 10, 1992

[30] Foreign Application Priority Data

Mar. 13, 1991 [FR] France .................. 91 03037

[51] Int. Cl.$^5$ .................. B01D 33/04; C02F 11/00
[52] U.S. Cl. .................. 210/396; 210/401; 210/408; 100/118
[58] Field of Search .......... 210/386, 400, 401, 406, 210/408, 297, 396; 100/90, 118

[56] References Cited

U.S. PATENT DOCUMENTS

| | | | |
|---|---|---|---|
| 1,669,973 | 5/1928 | Credo . | |
| 3,537,584 | 11/1970 | MacDonald | 210/400 |
| 3,951,805 | 4/1976 | Dodd | 210/400 |
| 4,019,431 | 4/1977 | Bastgen | 210/386 |
| 4,062,779 | 12/1977 | Nakamura et al. | 210/401 |
| 4,181,616 | 1/1980 | Bahr | 210/386 |
| 4,303,523 | 12/1981 | Ruppnig | 210/386 |
| 4,358,381 | 11/1982 | Takeuchi et al. | 210/297 |
| 4,761,895 | 9/1988 | Uyama et al. | 210/297 |
| 4,836,100 | 6/1989 | Johnson et al. | 210/400 |
| 4,921,608 | 5/1990 | Lee | 210/393 |

FOREIGN PATENT DOCUMENTS

| | | |
|---|---|---|
| 386819 | 10/1988 | Austria . |
| 0023899 | 2/1981 | European Pat. Off. . |
| 2564637 | 11/1985 | France . |
| 1545250 | 5/1979 | United Kingdom . |
| 2235393 | 8/1989 | United Kingdom . |

*Primary Examiner*—Peter Hruskoci
*Assistant Examiner*—Robert James Popovics
*Attorney, Agent, or Firm*—Pollock, VandeSande & Priddy

[57] ABSTRACT

Apparatus for dehydrating sludge originating from water purification stations, comprising a draining grid part positioned above a pressing-belt filter part, and a device for washing the grid wherein the device is positioned above the grid, so as to limit the drop height of the flocculated sludge between the grid and the belt, thus avoiding deflocculation of the sludge between the thickening stage and the dehydration stage, the washing of the grid being performed concurrently with the movement of the sludge on the grid.

6 Claims, 2 Drawing Sheets

COMPACT APPARATUS FOR TREATING SLUDGE BY DRAINING AND PRESSING

The present invention relates to an apparatus for treating sludge, intended more particularly for carrying out a solid-liquid separation and making it possible in particular to thicken and to dehydrate sludge originating from water purification stations.

BACKGROUND OF THE INVENTION

It is known that the treatment of sludge originating from water purification stations is commonly carried out by dehydration on a belt filter, this dehydration being preceded by a thickening operation which is carried out in a storage vessel which may be either static or gently agitated.

The present titleholder has in recent years developed a draining grid which must be washed countercurrentwise at regular intervals, this draining grid having been the subject of French Patent 85/07,026, which was applied for on May 9, 1985 and published under number 2,564,637. This draining grid, which replaces the thickener, makes it possible to produce less bulky dehydration plants which are easier to deodorize and, as a result, are less costly.

To limit the size of the dehydration plants, the draining grid and the belt filter have had to be placed side by side to form single machines, the diluted sludge entering at the grid side and leaving again after being pressed between the belts of the filter, into the form of dehydrated "cakes". However, such a device is limited in compactness, since the draining grid requires washing by countercurrent (downward) spraying with water. In such a known plant it is therefore impossible to arrange the grid part above the pressing-belt part of the filter, since the height needed for placing the countercurrent washing system under the grid necessitates an excessive height between this grid and the pressing belt, and this results in the destruction of the sludge which is flocculated with polymers when this sludge falls from the grid to the belt.

SUMMARY OF THE INVENTION

The present invention is therefore intended to get rid of the disadvantages of the solutions according to the prior art, recalled above, by making it possible to superpose the draining grid and the pressing-belt part of the filter, by creating a washing system, no longer countercurrent, but concurrent in a zone defined for this purpose, making it therefore possible to create a hydraulic continuity between the grid part and the belt part, which is compatible with the flocculation of sludge, even of the most fragile kind.

According to a preferred embodiment of the present invention, washing of the draining grid is carried out with the aid of a movable rack situated above the grid, the washing water being sprayed onto the grid in the forward movement of the rack, the said spraying being interrupted during the return movement of the movable rack.

According to the invention, the movable rack is positioned between two scrapers near each other and is driven between two end stops with the aid of spring blades which are integrally attached to the scrapers and moved with the aid of the endless-chain mechanism driving the scrapers of the draining grid.

BRIEF DESCRIPTION OF THE DRAWINGS

Other characteristics and advantages of the present invention will emerge from the description given below, with reference to the attached drawings, which illustrate an embodiment thereof without any limitation being implied. In the drawings.

DETAILED DESCRIPTION OF THE PREFERRED EMBODIMENT

Figure 1:
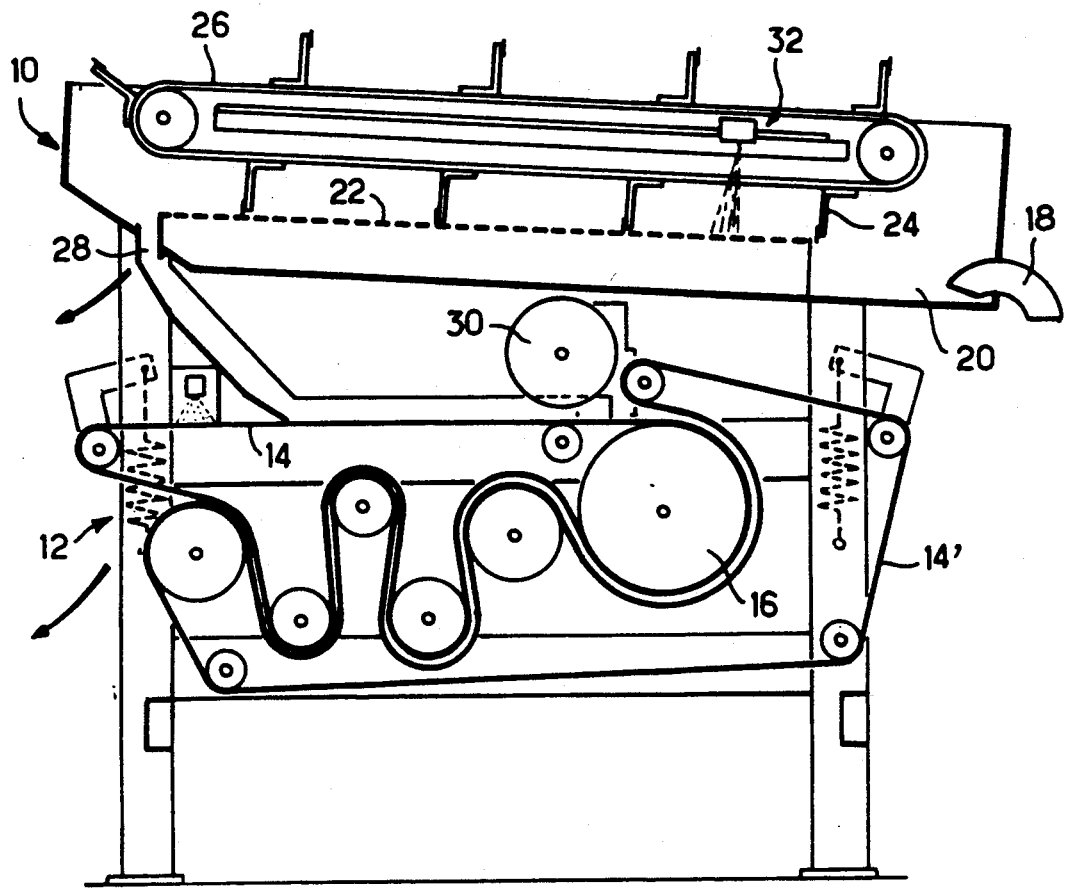
FIG. 1 is a general side elevation view of a sludge treatment apparatus according to the present invention.

With reference to FIG. 1, it can be seen that the apparatus according to the present invention generally comprises a draining grid assembly, indicated as a whole by reference 10, and a press module, indicated as a whole by reference 12. This press module is of the conventional double cloth type and comprises essentially filter cloths 14, 14' which run over pressing rollers 16 and are driven by a variable-speed motor (not shown in the figure). Since this part of the machine is, furthermore, well known, it will not be described here.

The sludge to be treated is introduced with a polyelectrolyte by means of a pipe 18 which feeds a distribution trough 20. The sludge then overflows onto a draining grid 22, through which it passes under the thrust of a series of scrapers 24, which are driven by a double chain 26 to which they are attached, as can be seen clearly in FIGS. 1 and 2. The interstitial water flows away through grid 22 and the separation of the sludge from the water is promoted by the construction of the sludge rollers rotating about themselves on grid 22, when scrapers 24 move.

At the end of the grid the sludge spills over onto filter cloth 14, which conveys it towards the pressing zone with the aid of a baffle 28, the plane of grid 22 and the plane of cloth 14 of the press part being then as close as possible to each other, since they are no longer separated by the washing system, given that the latter, according to the invention, is situated above grid 22. After passing under a compacting roller 30 the sludge is then taken between the two cloths 14 and 14' of the pressing-belt filter module 12 which, as explained below, forms part of the prior art and will not be described here.

The grid 22 is washed at regular intervals with the aid of a movable rack carrying nozzles and without stopping the sludge feed. The grid-washing system provided by the present invention is illustrated in detail by FIGS. 2 to 4, to which reference is now made.

A movable washing rack 32 is provided with a plurality of jets in the form of nozzles 34 pointing downwards. Rack 32 can move with an alternating horizontal translational motion, sliding by means of two guides 38, 38' along two guide tubes 36, 36' fitted with stops 40, 40' at each of their ends. Furthermore, chain 26 which carries scrapers 24 comprises two scrapers near each other 42, 44, between which movable rack 32 is placed. These scrapers 42, 44 are fitted with spring blades such as 46, one of whose ends is applied to rack 32. The presence of these spring blades makes it possible for movable washing rack 32 to be driven according to the movement referred to above.

The supply of water under pressure to the movable rack is obtained with the aid of a flexible pipe 33 which moves in an opening 35 provided in one of the side walls of the apparatus.

Figure 2:
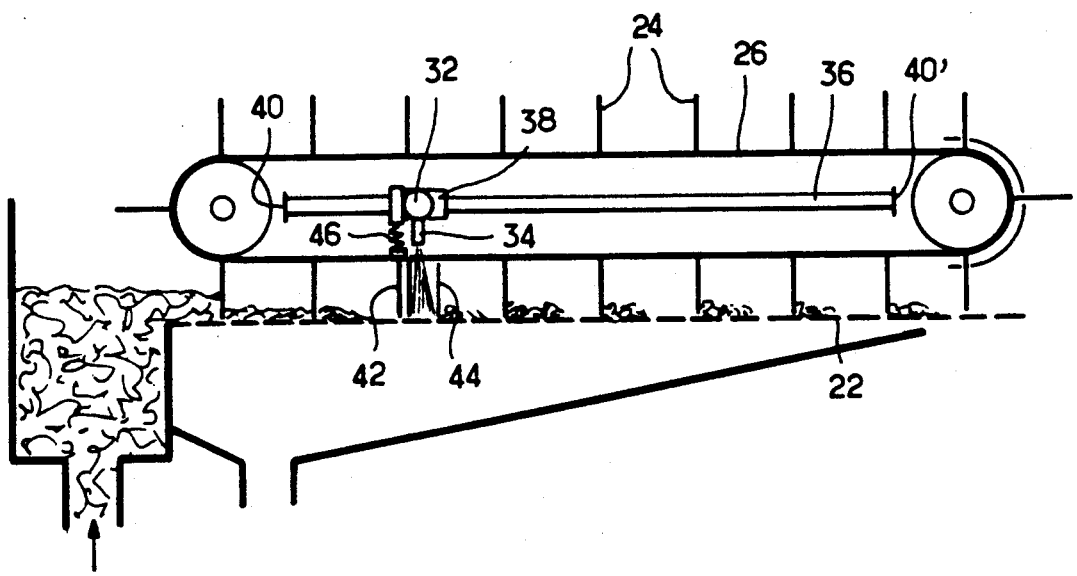
FIG. 2 is a partial side elevation view showing in detail the means provided by the invention for carrying out the washing of the draining grid.
Figure 3:
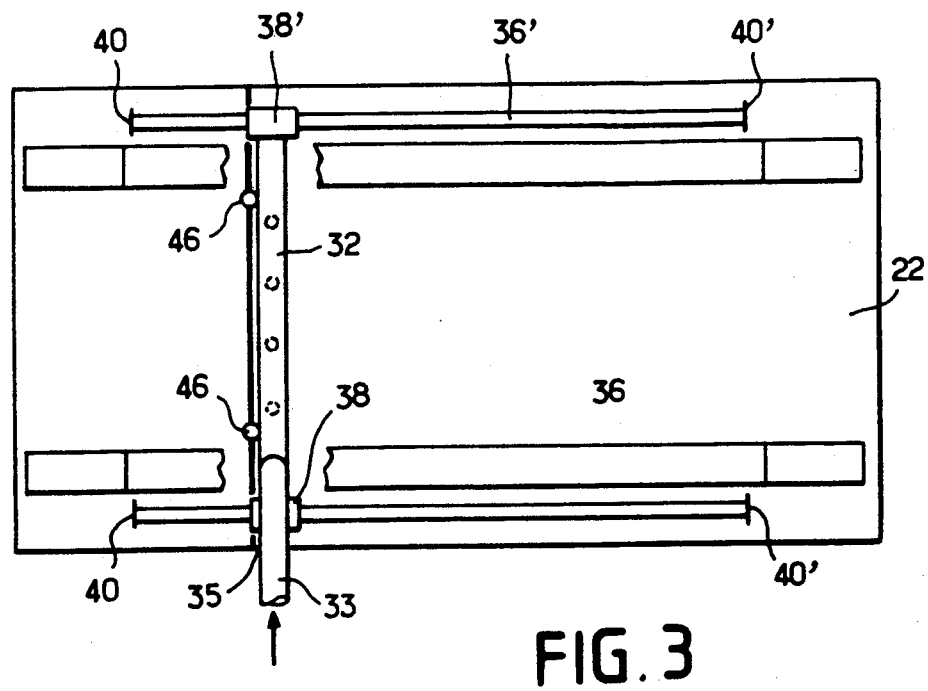
FIG. 3 is a plan view of FIG. 2.

When scrapers 42, 44 pass, the spring blades 46 push the rack 32 from the position limited by the stops 40 as far as the position limited by the stops 40'. There, the spring blades 46 escape below the rack 32, since the latter is stopped and they start pushing the rack 32 again, above the latter, when the upper strand of the chain 26 moves, in the reverse direction from the stops 40' to the stops 40. When the rack 32 reaches the stops 40 the spring blades 46 escape again, for just the time needed to return to the initial thrust position, as shown in FIG. 2.

According to the invention, two contacts, electrical or pneumatic, are provided at the location of the end stops 40, 40', in order to actuate an automatic valve responsible for supplying the rack with water under pressure when this rack moves from the stops towards the stops 40' and to shut off the water supply when the rack reaches the stops 40'. Washing of grid 22 is therefore carried out from above, between the scrapers 42, 44, entraining a very small quantity of sludge which has been trapped between these two scrapers.

The arrangement of the two scrapers near each other 42, 44 offers two advantages:
- on the one hand, it increases the washing efficiency by concentrating the energy of the washing water on a limited area; and
- on the other hand, the dilution due to the washing water affects only a very small quantity of sludge which is included between these two scrapers.

Figure 4:
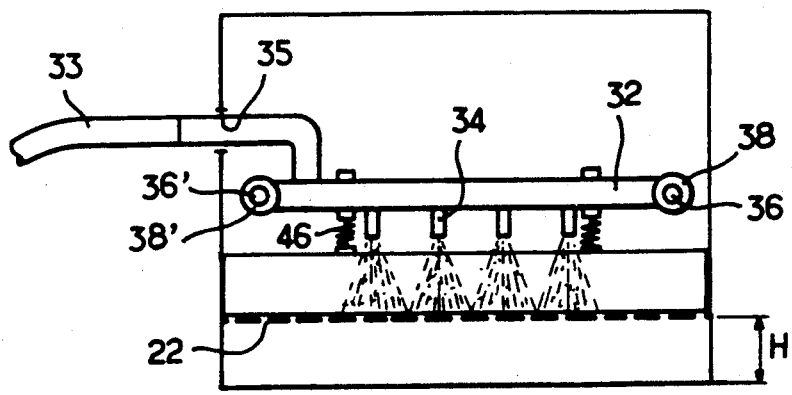
FIG. 4 is a front elevation view of the rack for washing the draining grid.

It will be noted, in particular in FIG. 4, that the height H under the grid 22 can be very low, since this height is dimensioned merely to ensure the flow of the draining water. It is this low height which allows the sludge to pass from the draining zone to the pressing zone without damaging the structure of the sludge which is flocculated with the polymers.

Furthermore, according to a preferred embodiment of the invention, grid assembly 10 and the double cloth filter module 12 are superposed from head to tail (see FIG. 1), and this makes it possible to place one above the other the outlets for sludge thickened on the grid and dehydrated sludge. It therefore becomes particularly simple, for example by switching the baffle 28, to use the same apparatus (pump, screw and the like) to pick up the thickened sludge or the dehydrated sludge, depending on the final description of the product.

It remains obvious that the present invention is not limited to the examples of embodiment described and/or shown here, but that it includes all the alternative forms.

We claim:

1. Apparatus for dehydrating sludge originating from a water purification station comprising:
   a draining grid for draining water from said sludge, said grid extending longitudinally between a sludge inlet portion and a thickened sludge outlet portion;
   scraper means for moving sludge along said grid from said inlet portion to said outlet portion;
   a pressing belt assembly for receiving drained sludge from said grid and pressing said drained sludge to form a thickened sludge, said belt assembly being positioned below said draining grid; and,
   a washing assembly for washing said grid with water concurrently with movement of sludge along said grid, said washing assembly being positioned above said grid and comprising a movable wash rack, a plurality of nozzles mounted on said wash rack for spraying water downwardly on said grid, and means for moving said wash rack longitudinally with respect to said grid while spraying water on said grid.

2. Apparatus according to claim 1 wherein said movable wash rack is positioned between two adjacent scrapers having spring blades integrally attached thereto, and is driven between stop means at said sludge inlet portion and stop means at said sludge outlet portion by longitudinal movement of said spring blades.

3. Apparatus according to claim 1 including means for supplying pressurized water to said nozzles during the forward motion of said wash rack, and means for interrupting the flow of pressurized water during its return motion.

4. Apparatus according to claim 1 wherein said washing assembly includes guide tubes having stop means at their ends and said movable rack is provided with slide means for sliding said guide tubes between said stop means.

5. Apparatus according to claim 2 including contact means at said stop means for activating automatic valve means for supplying pressurized water to said wash rack when said wash rack leaves one of said stops and for interrupting the flow of pressurized water when said wash rack reaches the other stop.

6. Apparatus according to claim 1 wherein said draining grid and said pressing belt assembly are mounted so that the outlet of each is on the same end of the apparatus, whereby either thickened sludge from the draining grid or dehydrated sludge can be collected at the same location.

* * * * *